United States Patent
Haulk et al.

(10) Patent No.: US 7,073,081 B2
(45) Date of Patent: Jul. 4, 2006

(54) METHODS AND APPARATUS FOR CONSERVING BATTERY POWER IN AN ELECTRONIC SHELF LABEL SYSTEM

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 563 days.

(21) Appl. No.: 10/044,440

(22) Filed: Jan. 11, 2002

(65) Prior Publication Data

US 2003/0135772 A1  Jul. 17, 2003

(51) Int. Cl.
*G06F 1/26* (2006.01)

(52) U.S. Cl. ........................ 713/323; 713/322; 713/324

(58) Field of Classification Search ................ 713/300, 713/310, 320, 323, 324; 705/80, 16, 28; 360/531, 539.1, 572.1, 572.2, 572.3, 572.4
See application file for complete search history.

(56) References Cited

U.S. PATENT DOCUMENTS

| | | | |
|---|---|---|---|
| 6,408,395 B1 * | 6/2002 | Sugahara et al. | 713/310 |
| 6,473,607 B1 * | 10/2002 | Shohara et al. | 455/343.1 |
| 6,505,303 B1 * | 1/2003 | Arima | 713/324 |
| 6,510,524 B1 * | 1/2003 | Osborn et al. | 713/323 |

OTHER PUBLICATIONS

Comer D. E. Computer Networks And Internets, 1999. Publiser: Alan Apt. Second Edition. pp. 82-84. TK5105.5. C5897.*

* cited by examiner

*Primary Examiner*—Thuan Du
(74) *Attorney, Agent, or Firm*—Priest & Goldstein, PLLC; Paul W. Martin

(57) ABSTRACT

An electronic price label (ESL) system with a reduced power consumption ESL is described. In one aspect, an ESL system and method conserves battery power by removing power from certain ESL components which are utilized to receive messages during time periods in which the ESL is not scheduled to receive messages. The host computer system transmits a power save command to the ESL instructing the ESL to cease downlink monitoring and remove power from at least a portion of the receiver circuitry. The power save command includes a start time and a predetermined time period, both which are stored in ESL registers. Alternatively, the power save command may include a start time and an end time. When the start time occurs, the ESL circuitry removes the power from the receiver and ceases downlink monitoring for messages, thus reducing the power consumed by the ESL. When the predetermined time period has passed, or when the end time occurs, the ESL circuitry restores power to the receiver, allowing the ESL to receive messages. A single broadcast message may be sent to all ESLs in a store, or a group of ESLs, allowing all the ESL receivers to be turned off in an efficient manner.

21 Claims, 3 Drawing Sheets

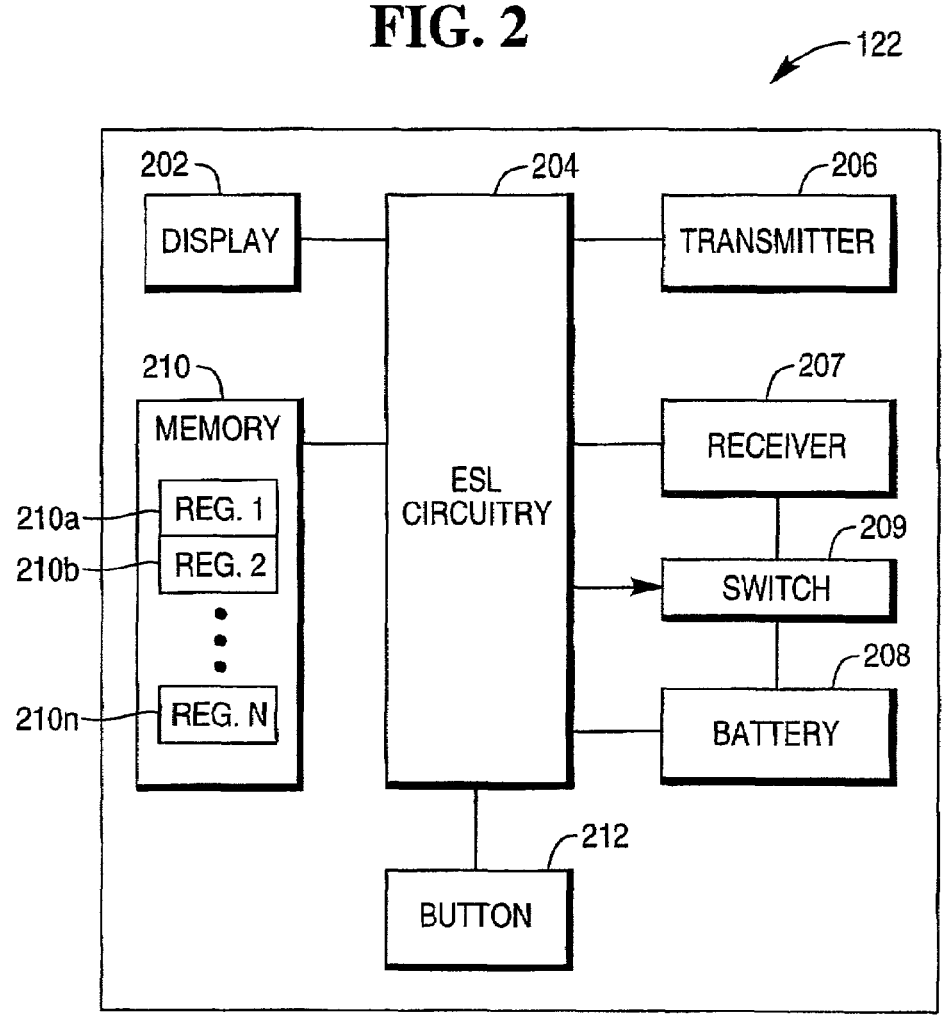

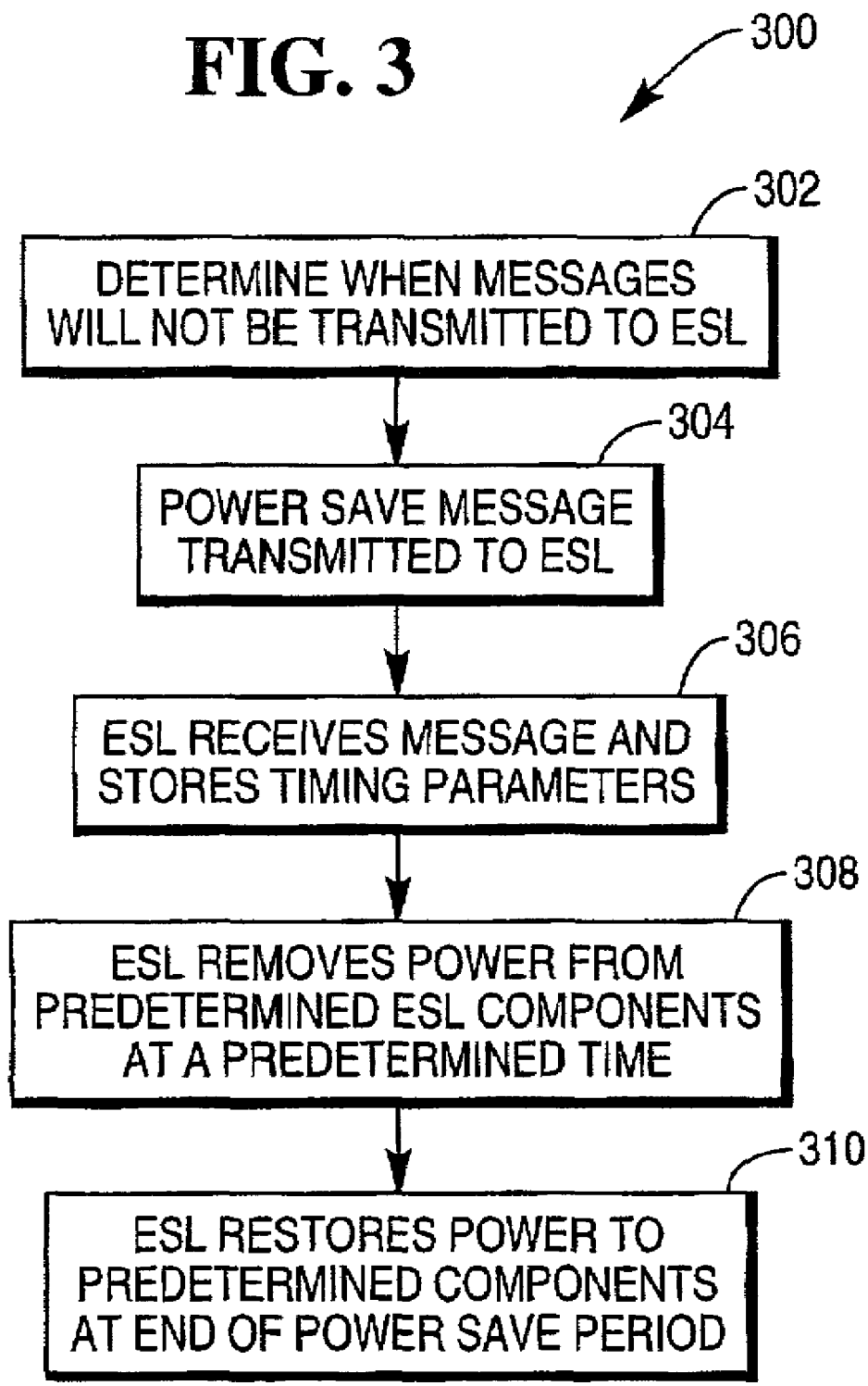

METHODS AND APPARATUS FOR CONSERVING BATTERY POWER IN AN ELECTRONIC SHELF LABEL SYSTEM

FIELD OF THE INVENTION

The present invention relates generally to improvements in electronic shelf label (ESL) systems used in transaction establishments. More specifically, the present invention relates to improvements in ESL systems including systems and methods for an ESL system which extend ESL battery life by reducing the power consumed by an ESL's receiver when the ESL is not scheduled to receive messages.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs.

An ESL includes a variety of components, such as, for example, a liquid crystal display (LCD), a transmitter, a receiver, ESL circuitry and memory, all of which may be powered by a battery. Replacing the battery in an ESL is a manual process which may involve a store employee going to the location of the ESL, removing the discharged battery and inserting a new battery into the ESL. Increasing the time between battery replacements would result in a lower cost of ownership for the ESL system owner by reducing both the number of replacement batteries which must be purchased and the amount of time store employees spend replacing the batteries. Given the large numbers of ESLs which are found in increasing numbers of retail establishments, the cost savings from the reduction of battery replacements can be significant.

To actively listen for commands or messages from the central server, the ESLs consumes battery power. However, in many situations, there are certain time periods when ESLs do not need to listen for messages because no messages are broadcast during those times. For example, some stores may not transmit messages to ESLs during the day, other stores may not transmit messages to ESLs during the night, or messages may be transmitted only at scheduled times.

Therefore, it would be desirable to provide an ESL system and method that conserves battery power by removing power from certain ESL components which are utilized to monitor for a received message during time periods in which the ESL is not receiving any messages.

SUMMARY OF THE INVENTION

The present invention advantageously provides methods and apparatus for an improved electronic shelf label (ESL) system. In one aspect, the present invention provides techniques which conserve battery power by removing power from certain ESL components which are utilized to receive messages during time periods in which the ESL is not scheduled to receive messages. The host computer system transmits a power save command to the ESL instructing the ESL to cease downlink monitoring and remove power from at least a portion of the receiver circuitry. The power save command includes a start time and a predetermined time period, both of which are stored in ESL registers. Alternatively, the power save command may include a start time and an end time. When the start time occurs, the ESL circuitry removes the power from the receiver and ceases downlink monitoring for messages, thus reducing the power consumed by the ESL. When the predetermined time period has passed, or when the end time occurs, the ESL circuitry restores power to the receiver, allowing the ESL to receive messages. In a preferred embodiment, a single broadcast message may be sent to all ESLs in a store, allowing all the ESL receivers to be turned off in an efficient manner. In another aspect, groups of ESLs may be woken up at different times.

A more complete understanding of the present invention, as well as further features and advantages of the invention, will be apparent from the following detailed description and the accompanying drawings.

BRIEF DESCRIPTION OF THE DRAWINGS

FIG. 2 is a block diagram of an ESL in accordance with the present invention; and FIG. 3 shows a method of reducing ESL power consumption in accordance with the present invention.

DETAILED DESCRIPTION

Figure 1:
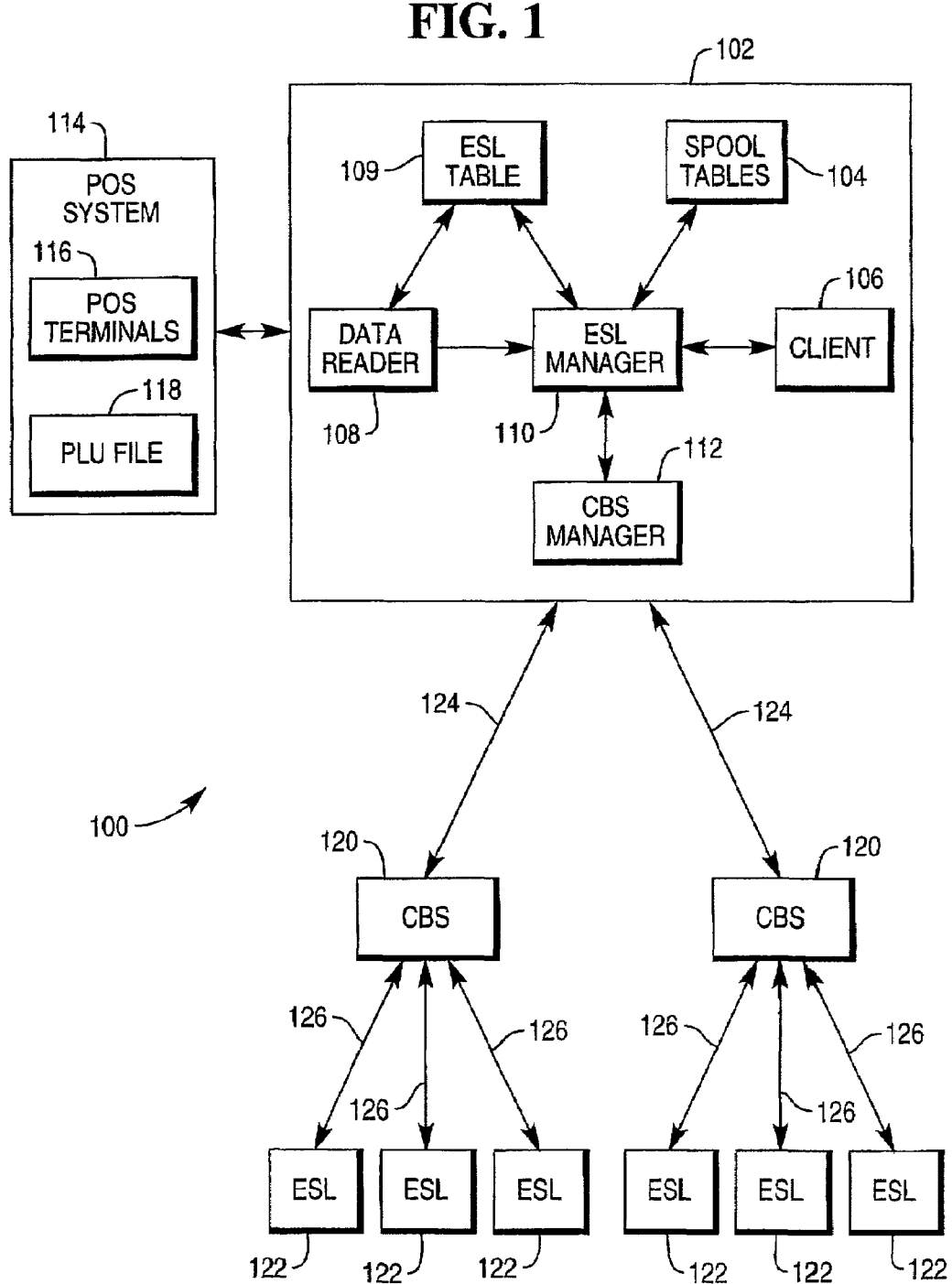
FIG. 1 shows a block diagram of a transaction management system in accordance with the present invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021, pending, filed Jan. 11, 2001 entitled "Methods and Apparatus for Performing Delta Updates of an Electronic Shelf Label", U.S. patent application Ser. No. 10/044,610, now U.S. Pat. No. 6,976,206, filed Jan. 11, 2001 entitled "Methods and Apparatus for Intelligent Data Bedcheck of an Electronic Shelf Label", U.S. patent application Ser. No. 10/044,020, now U.S. Pat. No. 6,626,359, filed Jan. 11, 2001 entitled "Methods and Apparatus for Reduced Electronic Shelf Label Power Consumption", U.S. patent application Ser. No. 10/044,535, now U.S. Pat. No. 7,707,219, filed Jan. 11, 2001 entitled "Methods and Apparatus for Error Detection and Correction of an Electronic Shelf Label System Communication Error", U.S. patent application Ser. No. 10/044,439, now U.S. Pat. No. 6,885,287, filed Jan. 11, 2001 entitled "Methods and Apparatus for Automatically Locating an Electronic Shelf Label", U.S. patent application Ser. No. 10/044,688, still pending, filed Jan. 11, 2001 entitled "Methods and Apparatus for Automatic Assignment of a Communication Base Station and Timeslot for an Electronic Shelf Label", U.S. patent application Ser. No. 10/044,687, now U.S. Pat. No. 6,877,133, filed Jan. 11, 2001 entitled "Methods and Apparatus for Error Detection and Correction in an Electronic Shelf Label System", all of which are assigned to the assignee of the present invention and incorporated by reference herein in their entirety.

FIG. 1 shows a transaction management system 100 in accordance with the present invention. The system 100 includes an ESL host computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client 106 and a communication base station (CBS) manager 112. POS system 114 includes a price look-up (PLU) file 118 and POS terminals 116.

The system 100 also includes CBSs 120 and ESLs 122. The CBSs 120 maybe suitably mounted in or near the ceiling of the retail establishment. ESLs 122 are typically attached to store shelving adjacent to items.

The ESL manager 110 records and schedules messages to the ESLs 122. The ESL manager 110 monitors and maintains an action list for the ESLs 122 utlizing spool tables 104, and provides a scheduling functionality for time related events which need to occur at a future point at time. Items on the action list may be provided from client components as requests for work, may be automatically generated by the ESL manager 110, or could be due to requests that required additional processing at a later date, such as, for example, a series of sale prices to be represented at the tags at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, power save commands and the like. Based on the response returned from the ESL 122 via the CBS manager 120, the ESL manager 112 then updates the ESL table 109 and spool tables 104 as appropriate. Such updates may include marking a particular task as completed, updating the data image of the ESL 122, and the like. A client application, such as client application 106, may interface with the ESL manager 110. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response from a particular ESL 122 and then passed that response to the CBS manager 112. Additionally, the CBS manager 112 monitors the CBSs 120 for problems and performs diagnostics on the CBSs 120.

The messages are sent to the CBSs 120 through communications link 124. Communications link 124 may suitably utilize radio frequency (RF) communication, infrared (IR) communication, a wired link, or some combination of communication techniques. After receiving a message from the host system 102, the CBSs 120 then transmit the message to the ESLs 122 utilizing communications link 126, which may utilize RF communication or some other suitable communication techniques. In an alternate embodiment, host system 102 may communicate directly with ESLs 122.

After receiving a message, the ESLs 122 transmit a response to CBSs 120 over communication link 126. The CBSs 120 would then process and retransmit the response message to the CBS manager 112 over communication link 124.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

FIG. 2 shows a block diagram of the ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication or some other suitable communication technique. A battery 208 provides power for the operation of ESL 122. The operation of ESL 122 is controlled by ESL circuitry 204. ESL circuitry 204 decodes incoming messages received, and performs any actions indicated by the messages. For example, if a load register message is received, the ESL circuitry 204 would cause a register to be updated with the new data. The ESL circuitry 204 controls the operation of a switch which in turn controls the power supplied to the receiver 207. The ESL 122 includes memory 210 comprising a plurality of registers 210a, 210b, . . . , 210n. The ESL memory 210 may contain many types of information. For example, the registers may contain the actual text to be displayed by the ESL 122. This text may include item price, informative or promotional text, text directed to employees, and the like. The registers may also contain data which controls various parameters related to the display of the text, such as display register selection and timing sequences, for example. The ESL 122 may also include a button 212 which may be depressed to initiate a particular function, such as, for example, the display of an alternate message.

To actively listen for commands or messages transmitted from the central server, an ESL 122 must consume battery power to perform downlink monitoring and operate the receiver 207. However, in many situations, there are certain time periods when ESLs 122 do not need to listen for messages because no messages are broadcast during those times. For example, some stores may not transmit messages to ESLs during the day, and other stores may not transmit messages to ESLs during the night.

The present invention provides an ESL system and method that conserves battery power by removing power from certain ESL components which are utilized to receive messages during time periods in which the ESL 122 is not scheduled to receive any messages. In one aspect of the present invention, the host computer system 102 transmits a power save command to the ESL 122 instructing the ESL 122 to stop downlink monitoring and remove power from at least a portion of the receiver circuitry. The power save command includes a start time, such as 9:00 AM, and a predetermined time period, such as 12 hours, both which are stored in the ESL's memory or registers, such as registers 210a and 210b, for example. Alternatively, the power save command may include a start time and an end time, such as 9:00 AM and 9:00 PM, respectively. When the start time occurs, the ESL circuitry 204 removes the power from the receiver 207 by turning the switch 209 off. The ESL 122 ceases downlink monitoring for messages, thus reducing the power consumed by the ESL 122. When the predetermined time period has passed, or when the end time occurs, the ESL circuitry restores power to the receiver 207 by turning the switch 209 on, allowing the ESL to receive messages.

As an example, assume a retail establishment transmits messages to ESLs 122 only when the store is closed. If the store closes at 9:00 PM and reopens at 6:00 AM, then there is no need for the ESL receivers 207 to consume battery power from 6:00 AM to 9:00 PM. The retail establishment's host computer may transmit one or more messages to the ESLs 122, instructing the ESLs 122 to remove power from each ESL's receiver 207 at 6:00 AM and then to restore power at 9:00 PM. In a preferred embodiment, a single broadcast message may be sent to all ESLs 122 in a store, allowing all the ESLs 122 to be turned off in an efficient manner.

In one aspect of the present invention, the ESLs may be removed from reduced power consumption mode in staggered groups. Such a technique would further reduce power consumption by the ESLs. For example, the ESLs in the dairy department may only receive messages from 9:00 AM to 10:00 AM, and the ESLs in the frozen food section may only receive messages from 10:00 AM to 11:00 AM, and the like. Messages to the individual groups may be staggered to allow a group of ESLs to receive messages only in the time frame in which messages may be transmitted to the group.

In an alternate embodiment, to allow an override function, the reduced power mode may be ended manually by pressing the button 212.

FIG. 3 shows a method 300 of conserving ESL battery power in accordance with the present invention. In step 302, a determination is made when messages are not scheduled to be transmitted to an ESL. In step 304, a host computer system transmits a power save command to the ESL instructing the ESL to stop downlink monitoring and enter a reduced power consumption mode by removing power from at least a portion of the ESL receiver circuitry. The power save command may include a start time and a predetermined reduced power mode time period. Alternatively, the power save command may include a start time and an end time. In step 306, the ESL receives the message and stores the timing parameters. In step 308, when the start time occurs, the ESL circuitry removes the power from selected components, such as the ESL receiver. The ESL ceases downlink monitoring for messages, thus reducing the power consumed by the ESL. In step 310, when the predetermined time period has passed, or when the end time occurs, the ESL circuitry restores power to the receiver, allowing the ESL to receive messages.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A method of reducing power consumption by an electronic shelf label (ESL) comprising the steps of:
   (a) wirelessly receiving a message by a receiver in the ESL, wherein the message includes a time period during which the receiver does not receive any additional messages, and a command to enter a reduced power consumption mode at a beginning of the time period and to leave the reduced power consumption mode at an end of the time period;
   (b) storing the time period in a memory of the ESL by control circuitry in the ESL;
   (c) turning off a switch in the ESL at the beginning of the time period by the control circuitry to remove battery power from the receiver to enter the reduced power consumption mode in accordance with the command while other ESL components remain powered;
   (d) timing the time period by the control circuitry; and
   (e) turning on the switch at the end of the time period by the control circuitry to reapply the battery power to the receiver and facilitate reception of the additional messages in accordance with the command.

2. The method of claim 1 wherein the message includes a start time for the reduced power consumption mode.

3. The method of claim 2 wherein the message includes an end time for the reduced power consumption mode.

4. The method of claim 2 wherein the message includes a duration for the reduced power consumption mode.

5. The method of claim 1 wherein a plurality of additional ESLs receive the message and each enter the reduced power consumption mode by removing the battery power from each ESL's receiver.

6. The method of claim 1 wherein the ESL is disposed in a retail establishment and the time period corresponds generally to when the retail establishment is closed.

7. The method of claim 1 wherein the ESL is disposed in a retail establishment and the time period corresponds generally to when the retail establishment is open.

8. The method of claim 1 wherein the time period corresponds to a time period when no ESL activity is planned.

9. The method of claim 1 wherein step (c) comprises the following sub-step:
   ceasing to monitor for received messages.

10. The method of claim 1 further comprising, after step (c), the following step:
    (f) recording depression of a button on the ESL to end the reduced power consumption mode by the control circuitry.

11. An electronic shelf label (ESL) system comprising:
    an ESL comprising a display for displaying informational text, a receiver for receiving wireless messages, a battery for providing power, a memory, a switch for applying the power to the receiver from the batter, and control circuitry for controlling operation of the ESL including controlling application and removal of the power by the switch; and
    a host computer for wirelessly transmitting a message to the ESL including a time period during which the receiver does not receive any additional messages, and a command to enter a reduced power consumption mode at a beginning of the time period and to leave the reduced power consumption mode at an end of the time period;
    said receiver receiving the message, and said control circuitry storing the time period in the memory, turning off the switch to remove the power from the receiver at the beginning of the time period in accordance with the command while other ESL components remain powered, and turning on the switch at the end of the time period to reapply the power to the receiver and facilitate reception of the additional messages in accordance with the command.

12. The ESL system of claim 11 wherein the message includes a start time for the reduced power consumption mode.

13. The ESL system of claim 12 wherein the message includes an end time for the reduced power consumption mode.

14. The ESL system of claim 12 wherein the message includes a duration for the reduced power consumption mode.

15. The ESL system of claim 11 further comprising an additional plurality of ESLs, wherein the message is transmitted to the plurality of ESLs instructing the plurality of ESLs to each enter the reduced power consumption mode by removing the power from each ESL's receiver at the beginning of the time period.

16. The ESL system of claim 11 wherein the ESL is disposed in a retail establishment and the time period corresponds generally to when the retail establishment is closed.

17. The ESL system of claim 11 wherein the ESL is disposed in a retail establishment and the time period corresponds generally to when the retail establishment is open.

18. The ESL system of claim 11 wherein the ESL ceases to monitor for received messages during the reduced power consumption mode.

19. The ESL system of claim 11 wherein the ESL further comprises a button for causing the control circuitry to end the reduced power consumption mode when depressed.

20. A method of reducing power consumption by a plurality of electronic shelf label (ESLs) comprising the steps of:

(a) wirelessly receiving messages by receivers in each of the ESLs, wherein the messages include different time periods during which the receivers do not receive any additional messages, and a command to enter a reduced power consumption mode at a beginning of the time periods and to leave the reduced power consumption mode at different ends of the time periods;

(b) storing the time periods in memories of the ESLs by control circuitries in the ESLs;

(c) turning off switches in the ESLs at the beginning of the time periods by the control circuitries to remove battery power from the receivers to enter the reduced power consumption mode in accordance with the command while other components in the ESLs remain powered;

(d) timing the time periods by the control circuitries; and (e) turning on the switches at the different ends of the time periods by the control circuitries to reapply the battery power to the receivers and facilitate reception of the additional messages in accordance with the command.

21. The method of claim 20, wherein step (a) comprises:

(a-1) wirelessly receiving the messages by the receivers in groups of the ESLs, wherein the messages assign the different time periods to the groups, and wherein the command causes the groups to leave the reduced power consumption mode one group at a time at the different ends of the time periods.

* * * * *